Nov. 14, 1939.   G. SOLOMON   2,180,127
AUTOMOBILE PARKING DEVICE
Original Filed Nov. 16, 1938   2 Sheets-Sheet 1
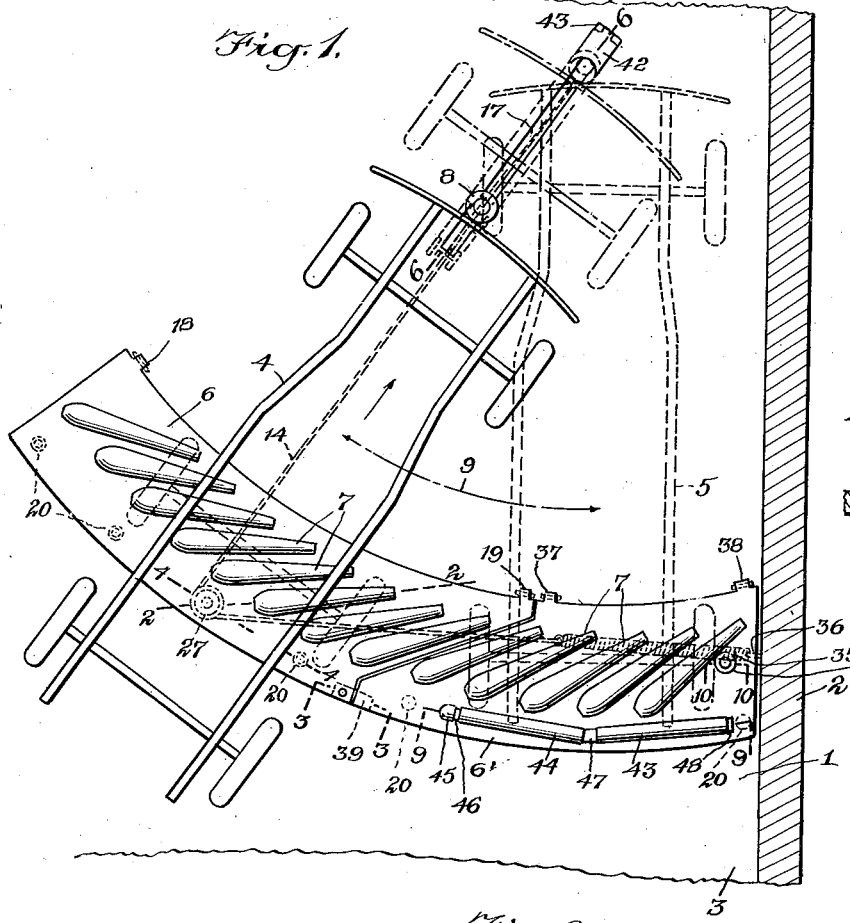
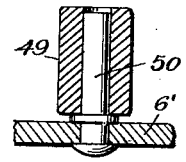
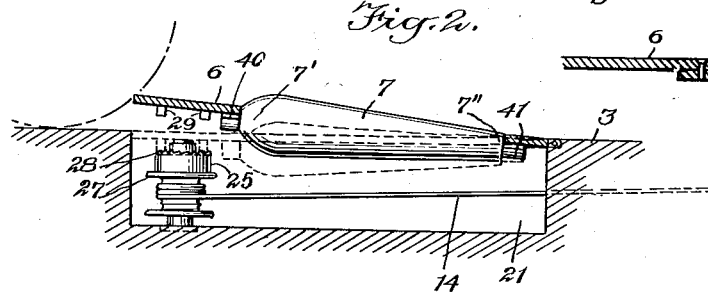
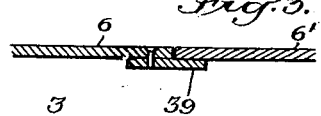
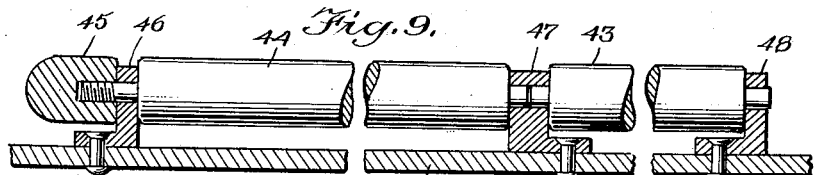
INVENTOR
Guillermo Solomon
BY
ATTORNEYS

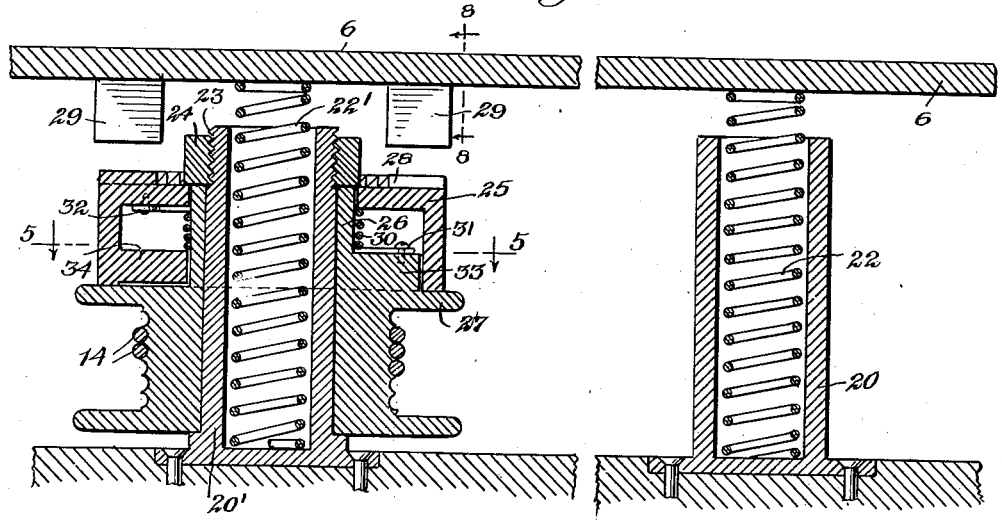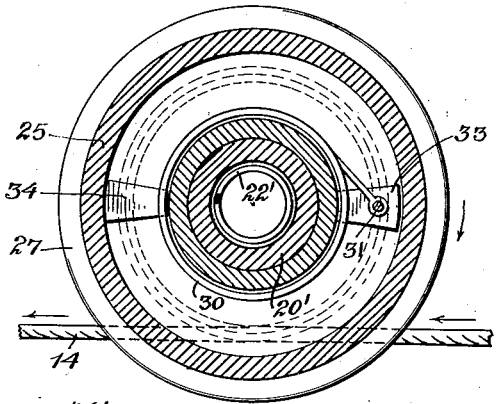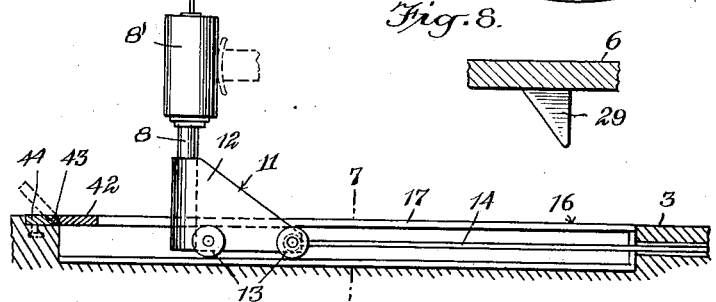

Patented Nov. 14, 1939

2,180,127

UNITED STATES PATENT OFFICE 2,180,127

AUTOMOBILE PARKING DEVICE

Guillermo Solomon, Santiago, Dominican Republic, West Indies

Application November 16, 1938, Serial No. 240,875
Renewed October 7, 1939

5 Claims. (Cl. 214—16.1)

This invention relates to an automobile parking device and has for an object to provide an improved construction which may be used on the street near the respective curbs, or used in garages or other places where it is desired to park a car in a comparatively small space.

Another object of the invention is to provide a parking device for automobiles whereby the automobiles may be driven up to the parking location and parked without backing.

A further object of the invention is to provide a parking device for automobiles wherein a stop or abutment is provided for limiting the forward movement of an automobile and inclined rollers arranged at a desired distance from the abutment for causing the rear wheels of the automobile to skid sidewise and thereby move the automobile laterally into parking position.

In the accompanying drawings—

Fig. 1 is a top plan view of a parking device disclosing an embodiment of the invention with an outline of an automobile, part of the road being shown in connection therewith;

Fig. 2 is an enlarged fragmentary sectional view through Fig. 1 approximately on the line 2—2;

Fig. 3 is a fragmentary sectional view through Fig. 1 approximately on the line 3—3;

Fig. 4 is an enlarged fragmentary sectional view through Fig. 1 approximately on the line 4—4;

Fig. 5 is a fragmentary transverse sectional view through Fig. 4 on the line 5—5;

Fig. 6 is an enlarged fragmentary sectional view through Fig. 1 approximately on the line 6—6;

Fig. 7 is a transverse sectional view through Fig. 6 approximately on the line 7—7;

Fig. 8 is a detail fragmentary sectional view through Fig. 4 approximately on the line 8—8;

Fig. 9 is an enlarged detail fragmentary view through Fig. 1 approximately on the line 9—9;

Fig. 10 is a sectional view through Fig. 1 approximately on the line 10—10.

Referring to the accompanying drawings by numeral, 1 indicates part of a garage, while 2 indicates the wall and 3 the floor thereof. The device as illustrated in Fig. 1 has been shown in a garage but it could be used in the street or other place without departing from the spirit of the invention. When parking an automobile it is desired to place it substantially parallel to the wall 2 and as near the wall as convenient. As indicated in Fig. 1, the automobile 4 is shown in dotted lines as having been moved to a full parking position.

When the automobile is to be parked it passes to the position shown in Fig. 1 and continues movement in the same direction until the rear wheels pass over the platform 6 and move on to the various rollers 7. When this happens the rear wheels of the automobile will rotate without moving the automobile forward as the bumper of the automobile is pressing against the post 8. As the rear wheels of the automobile continue to rotate the automobile will swing laterally toward the right, as indicated by the double-headed arrow 9. After the automobile has been parked as shown in dotted lines in Fig. 1, it may be swung out of parking position by reversing the rotation of the rear wheels, whereon the automobile will swing as indicated by the double-headed arrow 9, but the swinging movement will be toward the left. As soon as the automobile has swung to substantially the position shown in Fig. 1 it will move off the rollers 7 and backward the desired distance.

When the front wheels of the automobile strike the platform 6, this platform will swing downwardly and then upwardly and then the bumper of the automobile will engage the post 8. This post has a sighting post 10, as indicated in Fig. 6. The post 8 is secured to a carriage 11 having a U-shaped body 12 mounted on four rollers 13. A cable 14 is connected to the end of this carriage and as the automobile bumper engages and pushes post 8 to the left, as shown in Fig. 6, cable 14 will be pulled. It will be noted that the carriage 11 extends between U-shaped members 15 and 16 and the rollers 13 are rotatably mounted in these members so as to be guided thereby. The members 15 and 16 are preferably metal and are embedded in the floor 3 of the garage as illustrated particularly in Figs. 1, 6 and 7. This provides a guide for the carriage so that it will move back and forth through what appears to be a slot 17 (Fig. 1), though this slot is really a space between the members 15 and 16. The post 8 is provided with a rotating casing or drum 8' so that when the bumper of the automobile strikes the post it will engage the drum 8' and as the automobile swings to one side the drum 8 will rotate therewith.

The platform 6 is arc-shaped and is hinged at 18 and 19. A plurality of spring-bearing posts 20 (Fig. 4) are arranged at spaced points in the well cavity 21 beneath platform 6 so that the compression springs 22 carried by post 20 will resiliently support the platform 6, whereby it will normally remain at an angle or in substantially the position shown in Fig. 2. When the rear wheels of an automobile move on to platform 6 it will swing downwardly until it rests on the various posts 20. Also arranged in the well cavity 21 is a hollow post 20' carrying its spring 22'. Post 20' is provided with a threaded portion 23 which is adapted to receive a nut 24, which nut overlaps the member 25 and also rests on the extension 26 of a drum 27, which prevents the drum from moving upwardly and also prevents the member 25 from moving upwardly while allowing these members to rotate. The member 25 at the top is provided with a number of teeth 28 adapted to mesh with the respective teeth 29 carried by the platform 6. When this platform is lowered teeth 29 will mesh with teeth 28 and hold member 25 stationary. However, the drum 27 may freely rotate and as it rotates it will wind the spring 30, which spring has one end connected at 31 to the drum and the other end, namely 32, to member 25 as shown clearly in Fig. 4. The spring 30 is connected to an abutment or lug 33 preferably integral with drum 27, while the member 25 is provided with an abutment 34 beneath the connection 32. These abutments 33 and 34 of drum 27 in actual use are in step-by-step contact and when member 25 is stopped drum 27 revolves almost one complete revolution, that is, one revolution less the distance occupied by both abutments 33 and 34. Fig. 5 shows abutments 33 and 34 one-hundred-and-eighty degrees apart in order to make the drawings and construction clear.

It will be noted that one end of the cable 14 is connected to carriage 11 and the other end is connected to a retractile spring 35 (Fig. 1), which is connected at 36 to an auxiliary platform 6'. The cable is given one or more turns around the drum 27 so that when the bumper of the automobile 4 strikes the post 8 and pushes the same to the left, as shown in Fig. 6, the drum 27 will be rotated and member 25 will be rotated therewith. As soon as the rear wheels of the automobile move on to the rollers 7, the platform 6 will swing downwardly so that the teeth 28 and 29 will mesh, whereupon post 8 cannot move any further and, consequently, the forward movement of the automobile is stopped but the rear wheels are allowed to rotate and as they rotate they will coact with rollers 7 and swing the automobile to the right as shown in Fig. 1. As the automobile swings to the right it will gradually move over the platform 6'. This platform is hinged at 37 and 38 and is supported by two or more posts similar to post 20 but is not provided with springs. Springs are not necessary as a part of the platform 6' overlaps the bar 39, as shown in Fig. 3, which is screwed or otherwise rigidly secured to the platform 6. By reason of this construction, whenever platform 6 is swung upwardly platform 6' will move therewith. When platform 6 is moved downwardly by the weight of the automobile platform 6' will move downwardly by gravity.

From Fig. 1, which shows the general assemblage, it will be noted that the various rollers 7 are all at substantially the same angle with respect to hinge 43 with the large end outermost. These rollers are all freely rotatable and by reason of their shape, as shown in Fig. 2, will cause the automobile to have a tendency to move forwardly when the rear wheels are resting on the rollers. Also by rotating the rear wheels the automobile will move laterally to the right, as shown in Fig. 1, until the tire of the right-hand rear wheel engages the roller 49 on the upstanding pin 50.

After the automobile has been correctly parked, as shown in Fig. 1, it may be readily removed by reversing the rear wheels. The central axes of the various rollers 7 are arranged in a horizontal plane when the respective platforms are lowered, but by reason of the fact that the rollers 7 are tapered, as shown in Fig. 2, the rear wheels will have a tendency to slide toward the left as they rotate.

When the automobile has been properly parked, as shown in dotted lines in Fig. 1, it will rest on certain of the rollers 7 and should the driver reverse the rotation of the rear wheels at an appreciably high rate of speed the tendency would be for the automobile to move backwards. Should this happen the rear wheels would move off the rollers 7 onto the platform 6 so that the automobile would run straight backwards instead of skidding to the left. To prevent an accident of this kind, rollers 43 and 44 have been provided together with an end roller section 45 as shown particularly in Figs. 1 and 9. Suitable journal brackets 46, 47 and 48 are carried by the platform 6' and rotatably support the rollers just described. These rollers freely rotate so that it will be difficult or impossible for the driver to back over these rollers and, consequently, the automobile when brought under more perfect control will move laterally to the left until it leaves the platform 6', whereupon it may be backed off the rollers 7. When the automobile is first being parked it is moved to the right, as shown in Fig. 1, until the tire of the right-hand rear wheel strikes the roller 49. This will prevent any further lateral movement but will not injure the wheel or automobile as the further rotation of the wheel will merely rotate roller 49 and accomplish no results.

From Fig. 2 it will be observed that the large end 7' is farthest from the post 8, while the small end 7'' is nearest the post 8. These rollers may be solid throughout and provided with axles or centrally positioned pins extending into bearing members 40 and 41 secured respectively to the platforms 6 and 6'.

From Figs. 1 and 6 it will be seen that there is provided a plate 42 at the upper part of the left-hand end of the track members 15 and 16 and this plate is hinged at 43 to a plate 44 secured in any desired way to the floor 3. Whenever it is desired to apply or remove the carriage 11, plate 42 is swung to the dotted position shown in Fig. 6 and then the wheels or rollers 13 may be swung through the opening left by plate 42. When the automobile is in the dotted position shown in Fig. 1, if the rear wheels are rotated in a way to back up the same will not move off the rollers 7 but will move upwardly a short distance on the rollers 7 and then slide forwardly and to the left. This is a more or less continuous motion and eventually the automobile will swing to the left until one of the rear wheels leaves the last roller 7 whereupon the desired traction on a stationary part will be secured and the automobile will back off in the usual manner. As soon as the automobile has cleared the platform 6, spring 35 will function to rotate the drum 27 and to move the carriage 11 and post 8 back to substantially the position shown in Fig. 1 ready for the next automobile.

I claim:

1. An automobile parking device including a yielding abutment, and means coacting with the automobile and the abutment for causing an automobile to be swung laterally into parking position, said means including an arc-shaped group of tapering rollers, the larger end of the rollers being farthest from said abutment.

2. An automobile parking device including an abutment against which an automobile presses when being parked, and means coacting with the automobile and the abutment for swinging the rear end of the automobile around into parking position, said means including a plurality of tapering rollers arranged at a tangent to the abutment and with the larger end farthest from the abutment, said rollers being grouped in an arc and positioned a sufficient distance from the abutment to cause the rear traction wheels of the automobile to rest on the rollers when the front of the automobile has been stopped by said abutment.

3. An automobile parking device including an abutment, means for resiliently holding the abutment in a given position, means for guiding the abutment so that it will move in a straight line when the front of the automobile presses against the same, said movement continuing until the abutment reaches a predetermined position, and means coacting with the automobile and the abutment for causing the rear end of the automobile to swing laterally while the front is in contact with the abutment, said means including an arc-shaped group of rollers, the direction of movement of said abutment being radial in respect to said group of rollers.

4. In a parking device of the character described, an arc-shaped platform formed in two sections, supporting posts for supporting the respective sections, means for hingedly mounting said sections, springs for swinging upwardly one of said sections, an underlapping tie member extending from the spring-actuated section to position beneath the other section whereby both sections will move upwardly under the action of said spring when permitted, a plurality of tapering rollers arranged on each of said sections, the rollers being all arranged substantially at the same angle with respect to the pivotal point of the front of the automobile when the same is skidded laterally into parking position, means for preventing the automobile from backing when in parking position, and means for causing the automobile to stop its forward movement when the rear wheels are resting on said rollers and said platform is swung downwardly to its lowermost position.

5. In a parking device of the character described, an abutment comprising a post, a carriage on which said post is mounted, said carriage being provided with traction means and a guide for said carriage whereby the carriage may move back and forth in a straight line, means including a spring for holding said post in a position at one end of said guide, and means coacting with the automobile and said post for causing the rear end of an automobile pressing against the post to swing laterally for approximately 30° into parking position.

GUILLERMO SOLOMON.